United States Patent [19]

Shaw

[11] 4,418,117

[45] Nov. 29, 1983

[54] CONDUCTIVE BARRIER COAT FOR ELECTROSTATIC MASTERS

[75] Inventor: Michael J. Shaw, Paw Paw, Mich.

[73] Assignee: Allied Paper Incorporated, Kalamazoo, Mich.

[21] Appl. No.: 451,784

[22] Filed: Dec. 21, 1982

Related U.S. Application Data

[62] Division of Ser. No. 235,602, Feb. 18, 1981, Pat. No. 4,379,822.

[51] Int. Cl.[3] .......... B32B 5/16; G03G 5/14

[52] U.S. Cl. .......... 428/327; 428/512; 428/514; 428/522; 428/407; 430/62

[58] Field of Search .......... 428/327, 512, 514, 522, 428/407

[56] References Cited

U.S. PATENT DOCUMENTS

| | | | |
|---|---|---|---|
| 3,798,032 | 3/1974 | Miller | 430/62 |
| 4,196,253 | 4/1980 | Spence | 428/512 |
| 4,341,839 | 7/1982 | Shaw et al. | 428/512 |
| 4,352,861 | 10/1982 | von Meer et al. | 428/512 X |
| 4,379,822 | 4/1983 | Shaw | 430/62 |

*Primary Examiner*—P. Ives

*Attorney, Agent, or Firm*—Richard H. Thomas

[57] ABSTRACT

An electrostatic master for lithographic printing characterized by a base, a barrier coat thereon, and a photoconductive layer. The barrier coat includes a hydrophobic thermoplastic film-forming resin having labile hydrogen-containing functional groups and a conductive agent. The conductive agent is a quaternary ammonium salt. The salts have only a minimal effect on water resistance and result in excellent reduction in the dielectric characteristics of the barrier coat.

3 Claims, No Drawings

CONDUCTIVE BARRIER COAT FOR ELECTROSTATIC MASTERS

This is a division, of application Ser. No. 235,602, filed Feb. 18, 1981, now U.S. Pat. No. 4,379,822.

The present invention relates to paper electrostatic masters for lithographic printing, and particularly to a novel conductive barrier coat formulation for such masters.

BACKGROUND OF THE INVENTION

Electrostatic masters are first imaged by one of several known ways and then are placed on a plate cylinder of an off-set duplicating press. The overall surface of the plate is then treated with an aqueous wet-out or fountain solution which wets all portions of the plate except those areas which have been imaged or are water repellant. The press inking rolls then pass over the surface of the plate and deposit a film of ink only on the ink-receptive imaged areas. In the printing operation, the ink from the imaged areas is transferred in reverse to a rubber off-set blanket which in turn prints directly onto a paper sheet so as to form a copy.

Because of the pressure imposed on the masters by the multiple rolls with which the master comes in contact, the aqueous fountain solution tends to be forced into the master requiring a high degree of water resistance necessary to prevent water absorption. Absorption of water into the base paper is likely to cause fiber swelling and dimensional expansion in a cross-machine direction, in turn causing buckle or what is known as cockle of the master. As the master enters various nips on the printing press, the cockle is flattened, creating a crease; this crease then picks up ink which reproduces on copies, causing a streak.

Co-pending application Ser. No. 315,287, filed Oct. 27, 1981, now U.S. Pat. No. 438,946, assigned to assignees of the present invention, describes the use of alkylene/unsaturated carboxylic acid copolymers for the formation of a barrier coat for a lithographic master. A preferred such copolymer is ethylene acrylic acid, which, following application from an aqueous solution and drying, forms a continuous water resistant barrier film suitable as a barrier coat for a conventional photoconductive topcoat.

This class of compounds and most other water resistant polymeric film forming materials are very dielectric, and barrier coats for electrostatic masters require a certain conductivity. As disclosed in co-pending application Ser. No. 315,287, it is a feature of the invention thereof that the class of compounds is so water resistant that such compounds can be applied in relatively low coat weights, sufficiently low so as to not adversely affect conductivity, and still provide a functional degree of water resistivity.

However, particularly for medium and long run liquid toner masters, for instance for run lengths over 2,000 copies, it may be desirable to employ heavier coat weights to the extent that a conductive agent is required. However, most effective conductive agents are either incompatible with alkylene/unsaturated carboxylic acid copolymers, or are insufficiently conductive to provide the degree of conductivity necessary for electrostatic masters.

Prior U.S. Pat. No. 3,798,032 to Lewis S. Miller, describes the formation of electroconductive coatings for copy sheets employing monomeric quaternary ammonium compounds such as choline chloride as the conductive agent. No reference is made in the patent to the use of such conductive agents in a barrier coat for electrostatic masters. The patent does make reference to barrier additives, but these are for the purpose of solvent hold-out and to prevent migration of conductive agents into the zinc oxide topcoat. Water resistance is not a criteria in the manufacture of copy paper and, in fact, one would expect that such monomeric ionic materials as choline chloride would normally have an adverse effect on water resistance. Although the patent mentions that both hydrophilic and hydrophobic polymers may be used in the formation of the coating, it is indicated that the former (hydrophilic), which have an affinity for water and are undesirable for electrostatic masters, are preferred for the copy paper which is produced.

Even the hydrophobic polymers described in the patent are said to be emulsified polymers, which would be hydrophilic on their surface so as to be in the emulsion state prior to application to a paper surface. At the point of drying, it is known that the coalescence of particles takes place and water soluble conductive materials may form into isolated pockets. The consequence of this is to have random dielectric and conductive areas eventually leading to image mottle. As such, it is likely that the components of the film will thus not be in a random admixture without any chemical or hydrogen bonding between the conductive agents and film forming polymers.

SUMMARY OF THE INVENTION

The present invention resides in the discovery of an improved electrostatic master which comprises a base; a barrier coat applied to said base; and a photoconductive layer containing a photoconductive material and a binder applied to said barrier coat. The barrier coat comprises a film forming amount of a hydrophobic, anionic, polymeric film-former, a conductive amount of a conductive agent, and a filler, all in proportion to obtain a resistivity less than about $10^{11}$ ohms per square in said barrier coat, the conductive agent being a low molecular weight monomeric quaternary ammonium salt having from one to three hydroxyalkyl or oxirane-alkyl radicals substituted thereon. By low molecular weight it is meant that the radicals substituted on the nitrogen atom have at most three carbon-atoms. A preferred conductive agent is choline chloride.

The film-forming polymer of the present invention preferably is an organic, synthetic, hydrophobic, thermoplastic film-forming resin having labile hydrogen-containing functional groups, e.g., carboxylic and/or hydroxyl groups, which is colloidally dispersible in a water, ammonia or alkali solution or is capable of forming a latex, and which on drying forms a film which is water resistant or hydrophobic. In an especially preferred embodiment of the present invention, the film-former is a copolymer of at least 60% ethylenically unsaturated polymerizable monomer having non-polar functionality, such as ethylene or propylene, and about 3-40% of a polymerizable olefinically unsaturated monomer having polar functionality, such as acrylic, methacrylic or crotonic acid, or salt thereof. An especially preferred such copolymer is an ethylene acrylic acid copolymer marketed under the trademark XD 8931 by Dow Chemical Co., containing about 80% ethylene and 20% acrylic acid (weight basis). Such copolymers are disclosed in U.S. Pat. Nos. 3,520,861 and 3,799,901, incorporated by reference herein.

It was found, unexpectedly, that the hydroxyalkyl quaternary ammonium salts of the present invention had a minimal effect on water resistance, even if used in the barrier coat at very substantial levels, and at the same time resulted in excellent reduction in dielectric characteristics of the barrier coat. This was found to be true even for low cost weights, especially with the use of the ethylene acrylic acid copolymers.

DETAILED DESCRIPTION OF THE INVENTION

The monomeric quaternary ammonium salts of the present invention preferably have the formula:

$$[R_A^1-N-R^2\,{}^{\oplus}{}_{(A-4)}]X^{\ominus}$$

where $R^1$ is a radical selected from the group consisting of $HOCH_2CH_2-$, 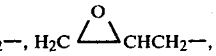, and 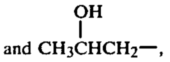, $R^2$ is lower alkyl having from one to three carbon atoms such as $CH_3$, $CH_3CH_2$ and $(CH_3)_2CH_2$; A is a positive integer selected from the group consisting of 1, 2, and 3; and X is an anion selected from the group consisting of chloride, fluoride, bromide, sulfate, phosphate or acetate. The low molecular weight monomeric quaternary ammonium salts defined above, containing radicals each (including hydrocarbon) having at most three carbon atoms, are compatible (cause no precipitation) with organic film-forming polymer barrier materials of the present invention.

The formula for choline chloride can be written as follows:

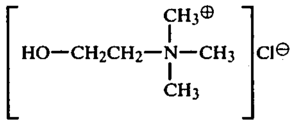

Choline chloride and methods of making the same are disclosed in U.S. Pat. No. 2,655,541 and the disclosure of this patent is incorporated into the present application by reference. The choline chloride is obtainable either as a dry, free-flowing powder, or in solution form. One suitable formulation of choline chloride is a 70% aqueous, clear solution sold by Diamond Shamrock Chemical Co. under the trademark "Nopco Choline Chloride, 70%". This solution can be added directly to the polymeric aqueous solution or dispersion of the present invention, and is fully compatible, no floculating taking place.

In place of chloride, the negatively charged radical of the above formula can be a phosphate, sulfate, acetate or other halide. The carbon/hydrogen substituting groups on the nitrogen atom can be any alkyl radical having from 1 to 3 carbon atoms or mixtures thereof, e.g., trimethyl, triethyl and dimethylethyl. Choline chloride has the advantage that the base choline (beta-hydroxyethyl trimethyl ammonium hydroxide) is a quaternary ammonium compound widely distributed in nature, and is readily reacted to the chloride salt. Its use therefor in the present invention is relatively inexpensive.

As mentioned, the mono-, di- and tri-hydroxy alkyl substituted salts (where A is 1, 2 or 3) all have good conductivity and are compatible with the film-forming polymers employed.

Broadly, the film-forming polymers of the present invention may be in latex form or colloidal dispersions, and may be any organic, synthetic, thermoplastic, film-forming resinous material having labile hydrogen containing functional groups (i.e., carboxylic and/or hydroxyl), which are dispersible in a water, ammonia or alkali solution and which, on drying, are water resistant or hydrophobic. Any of a large number of well known conventional film-forming latices may be used in the products of the present invention, as well as those capable of forming colloidal dispersions.

Preferred film-forming polymers for use in forming the aqueous dispersions of the present invention are random organic, addition copolymers or multipolymers of a nonacidic ethylenically unsaturated polymerizable monomer and an ethylenically unsaturated aliphatic carboxylic acid. The most satisfactory resinous materials contemplated for use herein are addition polymers which are normally solid at room temperature, e.g., 25° C., thermoplastic, normally insoluble in water and contain a plurality of functional groups, e.g., carboxylic acid groups. The film forming resin may be applied as a colloidal dispersion in an aqueous medium or as an aqueous latex. Suitable resinous materials for use in forming an aqueous colloidal dispersion or latex are the random copolymer products or mixtures of one or more polymerizable ethylenically unsaturated carboxylic acids such as acrylic acid, methacrylic acid, crotonic acid, maleic acid, maleic anhydride, itaconic acid, fumeric acid, citraconic acid, and citraconic anhydride, methylhydrogen maleate, and one or more nonacid polymerizable monomers such as ethylene, propylene, butene-1, 1,3-butadiene and other aliphatic olefins, e.g., styrene, alphamethylstyrene, vinyltoluene, chlorostyrene, and other aromatic olefins. Particularly suitable copolymers include multipolymers of ethylene and from about 10% to about 30% by weight of one or more ethylenically unsaturated acids such as acrylic acid, methacrylic acid, etc., as above stated; copolymers of ethylene with from about 10% to about 30% by weight of one or more ethylenically unsaturated acids, and up to about 20% by weight of one or more monomers such as ethylacrylate, vinyl acetate, vinylidene chloride, etc.; terpolymers of butadiene, styrene and from about 10% to about 30% by weight of one or more ethylenically unsaturated acids such as those mentioned above.

Specific examples of film forming latex copolymers which may be used in accordance with the present invention are as follows:

Latex Film Formers

Styrene-butadiene-acrylic acid, 60:30:10
Carboxylated Styrene butadiene, 60:40 (10% carboxy)
Polyvinyl acetate Reichhold, "Synthemul" 40-447
Polyvinyl acetate (alkali sol.) Reichhold "Synthemul" 40-450
Polyacrylic acid (firm) B. F. Goodrich "Hycar" 2600×84
Polyacrylic acid (stiff) B. F. Goodrich "Hycar" 2600×138
Polyacrylic acid (hard) B. F. Goodrich "Hycar" 2600×256

Polyvinyl chloride-vinyl acetate B. F. Goodrich "Geon" 352
Polyvinyl chloride-vinyl acetate B. F. Goodrich "Geon" 460×6
Polyvinyl chloride-vinyl acetate B. F. Goodrich "Geon" 575×43
Vinylidene chloride-vinyl chloride B. F. Goodrich "Geon" 652
Vinylidene chloride-acrylic acid B. F. Goodrich "Geon" 600×1
Butadiene/Styrene/Acrylonitrile B. F. Goodrich "Hycar" 1577
Polyacrylic Acid (Rohm & Haas) RA-90
Polyacrylic Acid (Hard) (Rohm & Haas) HA-16
Polyacrylic Acid (Firm) (Rohm & Haas) HA-12
Styrene-acrylic acid (Rohm & Haas) P-57
Acrylic/Vinyl Acetate (Rohm & Haas) E1310

Examples of the preferred colloidally dispersible film formers of the present invention Ethylene/acrylic acid copolymers, 70:30; 80:20; 90:10
Ethylene methacrylic acid copolymers, 70:30; 80:20; 90:10
Ethylene/itaconic acid copolymers, 70:30; 82:18; 90:10
Ethylene/methylhydrogen maleate copolymers, 80:20
Ethylene/maleic acid copolymers, 80:20
Ethylene/acrylic acid/methylmethacrylate terpolymers, 75:20:5

Other colloidally dispersible film formers that may be used

Propylene/acrylic acid copolymers, 80:20
Styrene/acrylic acid copolymers, 75:25
Styrene/methacrylic acid copolymers, 75:25
Styrene/itaconic acid copolymers, 70:30
Styrene/maleic anhydride copolymers, 70:30
Styrene/citraconic anhydride copolymers, 70:30
Methyl methacrylate/acrylic acid, 70:30

The above resins desirably contain from 10% to about 30% by weight of a carboxylic acid per 100 parts of resin dry basis.

Specific procedures and means for making the polymers are known to the art. The glass transition temperature (Tg) of the final copolymer preferably is below 115° C., more preferably below 100° C. The glass transition temperature can be controlled largely by the extent to which copolymerization is allowed to go, the lower molecular weight polymers favoring lower Tg's. Reference may be had to U.S. Pat. Nos. 3,799,901 and 3,753,965 for procedures for forming the aqueous dispersions of the resinous materials referred to above. In general, the process of forming the aqueous colloidal dispersion is carried out by digesting a noncolloidal mass of the polymer with an alkaline aqueous liquid medium as a continuous enveloping phase. The particle size of the dispersed resinous phase is extremely small, e.g., less than 0.1 micron. The non-colloidal mass usually comprises a common granular form of moldable resin materials, but can be any form of chip, bit or piece of material resulting from chopping or grinding, or molded bead, pill, pellet or other piece.

The base in the alkali aqueous medium is ammonia, ammonium hydroxide, or water soluble strongly basic organic amines, such as, mono, di, and trimethylamine and the like, which are volatilizable from the aqueous medium at elevated temperature, to yield a pH of from 5 to 10.

The concentration of the alkali base in the aqueous medium is a function of the concentration of the labile hydrogen containing group in the starting polymer, and the amount of such polymer to be dispersed in the aqueous medium. Usually, the amount of alkali corresponds to at least 0.2 equivalent per acid group of the polymer and preferably from 0.5 to about 1 equivalent of alkali per equivalent of acid group in the polymer. In the case of ammonium hydroxide, the amount of ammonia charged is greater, e.g., from about 5 to 10 and sometimes in the order of 20 or more equivalents per acid group, to obtain rapid dispersion. The formation of the aqueous dispersion is carried out by simply holding together the starting polymer and the aqueous alkali medium under autogenous pressure.

Another method of preparing the aqueous dispersions of the copolymers of the present invention is disclosed in U.S. Pat. No. 3,389,109 to Harmon et al. Inasmuch as it is desired to volatilize the solubilizing material from the composition of the present invention, the alkali materials which are used are limited to ammonium, ammonium hydroxide, and the low molecular weight alkyl amines.

In preparation of the electrostatic masters of the present invention, a paper web, preferably having high wet strength, may first be coated with a precoat for the purpose of obtaining a smooth surface, the precoat having a conventional coat formulation comprising a binder and filler. The formulation of the present invention then is applied to the precoat as a barrier coat by any of a number of suitable coating procedures, for instance a knife or blade coat apparatus. The barrier coat may be applied to one or both sides of the substrate. The coating is then dried by passing the paper through a suitable drying apparatus to remove the water constant. On leaving the dryer, the web is wound upon a reel, application of the zinc oxide coating usually being carried out in a later step. The barrier coat may be calendered subsequent to drying. For optimum results, for medium to long run masters (above 2,000 copies), a barrier coat weight of about 0.2 to 10 lbs./side/3,300 sq. ft. will be applied. Normally, the barrier coat will be applied to only the functional side of the substrate, where water resistance is required, but it may be desirable to apply it to both sides, for instance to avoid curl.

The barrier coat formulation of the present invention may include a number of ingredients in addition to conductive agent and polymer. For instance, the formulation may contain an amount of plastic particles, for instance as disclosed in co-pending United States application Ser. No. 186,756, now abandoned in favor of continuation application Ser. No. 340,210 filed Jan. 18, 1982. As disclosed in said co-pending application, the plastic particles tend to enhance conductivity, and also water resistance, after zinc oxide coating. Alternatively, following drying, the conductive barrier film may be treated with a solvent capable of coalescing the plastic particles. The plastic particles swell or dissolve which results, after evaporation of the solvent, in the plastic particles being cast as a coalesced semi- or totally continuous water resistant film. Examples of suitable plastic particles sensitive to a solvent such as toluene, are polystyrene, polyvinylacetate and copolymers thereof, polyvinylbutyral and copolymers thereof, polyacrylates and copolymers thereof, and mixtures of any of the above. The disclosure of Ser. No. 186,756 and Ser. No. 340,210 is incorporated by reference herein.

Preferably, the plastic particles have a particle size or range of sizes between about 0.01 to about 20 microns. The amount of plastic particles employed in the conductive film may vary over a wide range, depending upon properties desired of the film, for instance about 5% to about 100% based on the dry weight or solids weight of the film-forming polymer. Preferably, the plastic particle content is about 20% to about 40% based on the total coat weight, dry basis.

Other filler material may be added to the barrier coat formulation of the present invention, such as calcium carbonate or clay. However, such inorganic fillers usually tend to adversely affect water hold-out properties, and thus should be used in only small amounts. Thus, although the plastic particles may constitute from about 0% to 100% of the filler weight, 50–100% is preferred. The total filler weight normally is about 10–35% based on the polymer weight, dry basis.

Other pigment such as silica and alumina may be added to provide smoothness to the film or coat.

Broadly, the proportions of ingredients employed are such as to obtain a resistivity of less than about $10^{11}$ ohms per square in the barrier coat. In this regard, the film-forming polymer should be employed in a film-forming amount (defined as that amount necessary to form, on drying, a continuous or substantially continuous polymeric film on the substrate), and the conductive agent in a conductive amount (defined as that amount necessary to obtain the resistivity as stated). Generally, the conductive agent will be present in small quantities, for instance in the range of about 2–25% based on the weight of polymer (dry basis) employed. Preferably, the amount of conductive agent used is about 5–15%. With further addition of conductive agent, a trade-off with water resistance can be expected.

The amount of film-forming polymer employed is preferably between about 50% and about 95%, based on the total weight of the composition (dry basis).

If desired, the formulation of the present invention for a barrier coat may also contain an amount of ammonium zirconyl carbonate cross-linking agent as disclosed in applicant's co-pending application Ser. No. 222,014. The amount of ammonium zirconyl carbonate preferably is about 1–20% by weight based on the weight of the film-forming polymer. It was found that its presence prevented blocking that occurs when the paper sheet with barrier coat applied is wound upon a take-up reel or spool soon after drying. Because of the use of thermoplastic polymers, conventional drying temperatures may cause the paper to fuse together or block into a solid useless roll. While the problem can be alleviated mechanically with chill rolls and/or increased distance between the dryer and the end spool, it was found that the invention of application Ser. No. 222,014 provided a simpler chemical method for avoiding the problem.

The present invention will be illustrated by the following specific examples.

EXAMPLE I

A 63 lb/3,300 sq. ft. raw stock was blade precoated on both sides with 10 lbs/side/3,300 sq. ft. of precoat formulation which consisted of:

| | |
|---|---|
| Clay | 100 parts |
| Dow 722 plastic pigment (polystyrene, ½ micron) | 7.5 parts |

-continued

| | |
|---|---|
| Dow 620 styrene-butadiene latex | 18 parts |
| Soybean protein binder | 5 parts |

Following drying, the precoated sheet was given a blade coating in the amount of 0.5 lbs./side/3,300 sq. ft. by a coating A, as shown below. The coating in a series of runs was also modified with the addition of varying amounts of choline chloride and with the addition of 5% sulfonated polystyrene conductive agent (VTL 500, trademark National Starch Co.), as indicated in the following Table 1.

| COATING A FORMULATION | |
|---|---|
| Dow XD 30508 ethylene/acrylic acid | 100 parts |
| Dow 722 plastic particles | 25 parts |

The resultant sheet of base paper having coating A was then rod coated (to produce an electrostatic master) with 20 lbs./3,300 sq. ft. of zinc oxide photoconductive coat of conventional formulation, in a toluene solvent. The base paper, without a zinc oxide coat, was tested for water resistance, employing a 2½ minute base paper Cobb test. The master, with photoconductive coat, was tested with a wetpick test and also for good imaging characteristics.

The Cobb test consisted of placing the finished paper in contact with water for 2½ minutes, discarding the water, gently blotting excess water off the paper, and then determining the weight of water absorbed. This procedure correlates with the amount of water actually absorbed on a printing press.

The Cobb test is described in TAPPI Standards and Testing Methods P441M.

The procedure for wet pick test is as follows:

PROCEDURE FOR I.G.T. PICKS - WET AND DRY

<u>Materials:</u>

| | |
|---|---|
| I.G.T. Tester | "Instituut voor Grafische Technick T.N.O. Amsterdam 0.1-0.6" 35" 20"<br>Supplied by: Rudolph Meijer's Inc. Amsterdam, Holland Brouwersgracht 152/154<br>Equipped with 2 speeds (A = slow - 450 ft/min. maximum velocity and B = fast - 650 ft/min. maximum velocity) an adjustable pressure device and a spring drive device. |
| Inks | Inmont IPI Printing Inks - Black |
| Inking Apparatus | Timken A-2037<br>Single disk (of 9 mm width and 8" circumference) with a doctor-blade type metering device set for a 2 mil ink thickness |

<u>PROCEDURE:</u> This procedure is a modification of TAPPI suggested method T 499 su-64.

Samples were conditioned for ≧15 hours at 50% Rh prior to testing.

Strips were cut 1" × 10" along the machine direction from areas free from wrinkles, creases, etc. The strips were handled only by the edges so that the surface was free of oil and fingerprints.

Ink was applied directly to the inking apparatus disk with a spatula and the disk was turned in a clockwise direction in order to evenly distribute the ink over the entire surface at a 2 mil thickness.

A #3, 5, or 8 tack ink was used for the wet picks. The strips were completely submersed -continued

| PROCEDURE FOR I.G.T. PICKS - WET AND DRY |
|---|
| in water and allowed to soak for 5 minutes. The strips were then blotted to soak for 5 minutes. The strips were then blotted to remove the excess water and tested immediately. Pick results were recorded as distance in cm from the top of the inked area of the sample to the pick itself. The first sign of ink or fiber pick, no matter how small, was designated as the "1st pick". The point of total ink or fiber pick was designated as the "major pick". In general, it can be said the larger the pick distance in centimeters, the better the pick test. |

For imaging, the masters were, after preparation, conditioned overnight to 50% relative humidity and imaged on an A. B. Dick 675 Mastermaker. The masters were evaluated with respect to background and image mottle.

The results of these tests are summarized in Table I.

TABLE I

| Coating | $gm/m^2$ 2½ minute Base paper Cobb Test | I GT ZnO(1) Wet Pick Test | Imaging Tests(2) |
|---|---|---|---|
| Coating A + 5% VTL 500 | 15.8 | 7.4 | good |
| Coating A + 3% Choline Chl. | 5.7 | 8.0 | good |
| Coating A + 5% Choline Chl. | 6.0 | 11.2 | good |
| Coating A + 7% Choline Chl. | 5.1 | 15.3 | good |
| Coating A + 10% Choline Chl. | 4.3 | 10.4 | good |
| Coating A + 15% Choline Chl. | 4.7 | 17.4 | good |
| Coating A + 0% Choline Chl. | 2.4 | 20.0 | very poor |

(1)#3 Tack Ink, fast speed, 50 Kg. Pressure. A 20 rating = no picking. A 0 rating represents complete pick off.

From the results of Table I, it is apparent that good imaging characteristics were obtained at all levels of addition of choline chloride. In the absence of choline chloride, or any conductive agent, very poor imaging characteristics were obtained.

The conductive agent Versa TL 500 also gave good imaging characteristics but the surprising thing is that choline chloride at all levels gave much better pick resistance than the Versa TL 500, and also much better water resistance.

The improved water resistance using choline chloride is particularly advantageous in the construction of electrostatic masters since it offers substantially improved run lengths on conventional masters.

Although the reason for the improved water resistance is not completely understood, it is postulated that the mixture of ethylene acrylic acid copolymer ammonium salt, when dried in the presence of choline chloride, reacts with the choline chloride. Possibly, the cationic choline moiety is ionically bound to the carboxylate moiety of the ethylene acrylic acid resin. In this way, the ethylene acrylic acid is made conductive at random along the hydrophobic chain in such a way that water resistance is greatly improved over a simple admixture of a compatible anionic polymer such as sulfonated polystyrene, with the ethylene acrylic acid. The sulfonated polystyrene would not undergo such a reaction.

No incompatibility of the ethylene acrylic acid with the choline chloride was noted. In this regard, it should be noted that very few conventional conductive agents are compatible with such anionic polymers as ethylene acrylic acid. Sulfonated polystyrene is one, carbon black being another.

EXAMPLE II

This example illustrates practice of the present invention employing dihydroxyethyl dimethyl ammonium chloride as the conductive agent. The same precoated sheet as described in Example I was used as the base. Also, the same zinc oxide photoconductive coat of Example I was used. The basis formulation A contained, on a dry-weight basis:

| | |
|---|---|
| Dow XD 30508 ethylene/acrylic acid | 100 parts |
| Dow 722 plastic particles | 50 parts |
| Clay | 25 parts |
| Ammonium zirconyl carbonate | 5 parts |

Separate runs were made with formulation A; this formulation modified by the addition of 5 parts (based on the weight of polymer) Versa TL 500 (sulfonated polystyrene); the formulation modified by 10 parts choline chloride (also based on the weight of polymer); and finally the formulation modified by the addition of 10 parts dihydroxyethyl dimethyl ammonium chloride. The respective formulations were applied at two coat weights, 0.5 lbs/3300 sq. ft. and 1.0 lbs/3300 sq. ft.

All other conditions of preparation of the paper were as given in Example I. The results are listed in the following Table II:

TABLE II

| Formulation | Coat Weight lb/3300 sq.ft. | 2½ minute Cobb Test | IGT Wet Pick 25 Kg, fast speed #5 Ink | Imaging Degree of Toning on ZnO Master |
|---|---|---|---|---|
| A | 0.5 | 8.1 | 297 | Poor-Fair |
| A | 1.0 | 4.0 | 288 | Poor-Fair |
| A + 5% VTL | 0.5 | 15.9 | 203 | Very good |
| | 1.0 | 14.7 | 190 | Very good |
| A + 10% CC | 0.5 | 9.2 | 203 | Very good |
| | 1.0 | 8.2 | None | Very good |
| A + 10% DT Dihydroxyethyl dimethyl ammonium chloride | 0.5 | 12.3 | 163 | Very good |
| | 1.0 | 7.6 | 270 | Very good |

These data show that use of dihydroxyethyl dimethyl ammonium chloride in the barrier film substantially improves imaging characteristics and resistance to dielectric toning. Furthermore, it is seen that choline chloride (cc) had the least detrimental effect on water resistance (Cobb test) and resistance to ZnO picking, although the dihydroxyethyl dimethyl ammonium chloride compared very favorably, particularly with respect to the Versa TL (VTL) and particularly at the heavier cost weight of 1 lb/3300 sq. ft.

EXAMPLE III

This example shows the effectiveness of choline chloride with other polymers such as styrene-butadiene latex in obtaining improved water resistance and pick test characteristics in the preparation of electrostatic masters.

A number of samples were prepared using a precoated base, as in Example II, except the barrier coat formulations were varied as indicated in the following Table III (the formulations and procedures otherwise being the same as in Example II). The latex employed was Dow styrene-butadiene DL620. The comparative runs were XD 30508 with 10% choline chloride (dry basis, based on weight of polymer); DL 620 (styrene-butadiene latex) alone; and DL 620+10% by weight choline chloride. Coat weights were 3 lbs/3300 sq. ft.

TABLE III

| Formula | gm/$m^2$ 2½ minute Cobb Test | IGT Wet Pick Test On ZnO Master |
|---|---|---|
| XD 30508 | 0.5 | 114 |
| XD 30508 + 10% choline chloride | 0.55 | 223 |
| DL 620 (Styrene-Butadiene Latex) | 25.2 | 185 |
| DL 620 + 10% choline chloride | 26.25 | 183 |

These data show that at the higher coat weights (3 lbs/3300 sq.ft.):

1. Choline does not hurt water resistance much with a styrene-butadiene film former or ethylene/acrylic acid.

2. Choline either has little effect on the styrene-butadiene or offers an improvement over the straight film.

3. The degree of water resistance obtained depends on the film former used.

Resistivity in all of the barrier coats of the above examples, which coats contained choline chloride or dihydroxy dimethyl ammonium chloride (Ex. 2), present application of the ZnO coat, was less than 10" ohms per square, in accordance with concepts of the present invention.

What is claimed is:

1. In a substrate suitable for the preparation of printing masters comprising a base and a water resistant barrier coat applied to said base, the masters having a photoconductive layer comprising a photoconductive material and a binder applied to said barrier coat; the improvement wherein said barrier coat comprises, on a dry weight basis;

(a) a film-forming amount of about 50-95% of an ethylene acrylic acid copolymer;

(b) a conductive amount of about 5-15%, sufficient to obtain a resistivity less than about $10^{11}$ ohms per square, of a quaternary ammonium salt having the formula;

$$[R_A^1-N-R^{II}{}^{\oplus}{}_{(4-A)}]X^{\ominus}$$

wherein $R^1$ is a radical selected from the group consisting of $HOCH_2CH_2$; 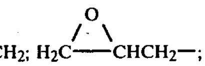; and 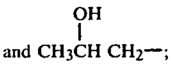;

$R^{II}$ is lower alkyl having from one to three carbon atoms;

A is 1, 2, or 3; and

X is an anion selected from the group consisting of chloride, fluoride, bromide, sulfate, phosphate or acetate; and (c) filler, a proportion of which is plastic particles, present in the amount of about 0-100% based on the dry weight of copolymer, said barrier coat being substantially free of materials which affect water resistance.

2. The substrate of claim 1 wherein said copolymer is cured with an ammonium zirconyl complex.

3. The substrate of claim 1 wherein said copolymer is about 80% ethylene: 20% acrylic acid.

* * * * *